(12) United States Patent
Shibata

(10) Patent No.: US 9,935,499 B2
(45) Date of Patent: Apr. 3, 2018

(54) POWER TRANSMITTING APPARATUS

(71) Applicant: PIONEER CORPORATION, Kanagawa (JP)

(72) Inventor: Koji Shibata, Kanagawa (JP)

(73) Assignee: PIONEER CORPORATION, Kanagawa (JP)

( * ) Notice: Subject to any disclaimer, the term of this patent is extended or adjusted under 35 U.S.C. 154(b) by 233 days.

(21) Appl. No.: 14/771,826

(22) PCT Filed: Mar. 19, 2013

(86) PCT No.: PCT/JP2013/057776
§ 371 (c)(1),
(2) Date: Sep. 1, 2015

(87) PCT Pub. No.: WO2014/147736
PCT Pub. Date: Sep. 25, 2014

(65) Prior Publication Data
US 2016/0020614 A1    Jan. 21, 2016

(51) Int. Cl.
*H02J 5/00* (2016.01)
*H02J 50/12* (2016.01)
*H02J 7/02* (2016.01)

(52) U.S. Cl.
CPC .............. *H02J 50/12* (2016.02); *H02J 5/005* (2013.01); *H02J 7/025* (2013.01)

(58) Field of Classification Search
CPC combination set(s) only.
See application file for complete search history.

(56) References Cited

U.S. PATENT DOCUMENTS

| 5,821,731 | A | * | 10/1998 | Kuki | ................... B60L 11/1805 |
| | | | | | 320/108 |
| 8,129,942 | B2 | | 3/2012 | Park et al. | |
| 8,248,027 | B2 | * | 8/2012 | Sakoda | ................... H02J 5/005 |
| | | | | | 307/104 |
| 9,126,490 | B2 | | 9/2015 | Cook et al. | |
| 9,142,972 | B2 | | 9/2015 | Takada et al. | |

(Continued)

FOREIGN PATENT DOCUMENTS

| JP | 6-11795 | 2/1994 |
| JP | 2009-504117 | 1/2009 |

(Continued)

OTHER PUBLICATIONS

International Search Report PCT/JP2013/057776 dated Jun. 4, 2013.

*Primary Examiner* — An Luu
(74) *Attorney, Agent, or Firm* — Young & Thompson

(57) ABSTRACT

A power transmitting apparatus (1) is provided with: a power feeder (13, 14, 15); a power receiver (23) disposed with a space from the power feeder; a power storing device (26) electrically connected to the power feeder and configured to supply power to a load (27); a distance changing device (16) configured to change a distance between the power feeder and the power receiver; a detecting device (25) configured to detect a power storage state associated with the power storing device; and a controlling device (11) configured to control the power feeder to change output power according to the detected power storage state, and configured to control the distance changing device to change the distance.

8 Claims, 4 Drawing Sheets

(56) References Cited

U.S. PATENT DOCUMENTS

| | | | |
|---|---|---|---|
| 9,403,440 B2* | 8/2016 | Ahn | B60L 11/182 |
| 9,660,487 B1* | 5/2017 | Mu | H02J 50/10 |
| 2010/0219183 A1 | 9/2010 | Azancot et al. | |
| 2010/0219693 A1 | 9/2010 | Azancot et al. | |
| 2010/0244584 A1 | 9/2010 | Azancot et al. | |
| 2010/0259401 A1 | 10/2010 | Azancot et al. | |
| 2015/0001959 A1* | 1/2015 | Shimokawa | H02J 17/00 307/104 |

FOREIGN PATENT DOCUMENTS

| | | |
|---|---|---|
| JP | 2011-029067 | 2/2011 |
| JP | 2011-030418 | 2/2011 |
| WO | 2011/142418 | 11/2011 |
| WO | 2012/058466 | 5/2012 |

* cited by examiner

POWER TRANSMITTING APPARATUS

TECHNICAL FIELD

The present invention relates to a power transmitting apparatus configured to perform non-contact or wireless power transmission.

Background Art

As this type of apparatus, for example, there is proposed an apparatus provided with a power feeder configured to feed power in a wireless manner by electromagnetic induction to a power receiver of a lighting apparatus slidably supported on a duct (refer to Patent Literature 1).

CITATION LIST

Patent Literature

Patent Literature 1: Japanese Patent Application Laid Open No. 2011-29067

SUMMARY OF INVENTION

Technical Problem

In this type of apparatus, in many cases, the power outputted from the power feeder is changed according to a state of an object of power feeding. Specifically, for example, if light quantity is increased in a lighting apparatus or if white lighting, which requires relatively high power consumption, is performed, then, relatively high power is outputted from the power feeder. On the other hand, if another color lighting, which requires relatively low power consumption, is performed, then, the power outputted from the power feeder may be relatively low.

By the way, as in this type of apparatus, if power transmission is performed in the wireless manner, strength of an electric field and a magnetic field emitted to surroundings of the apparatus is limited. For example, in Japan, radio wave protection guidelines are formulated by Ministry of Internal Affairs and Communications (refer to URL: http://www.tele.soumu.go.jp/j/sys/ele/body/protect/index.htm).

As in the technology described in the Patent Literature 1 described above, in the case where a distance between the power feeder and the power receiver is fixed, if the relatively high power is outputted from the power feeder, a shield case or the like configured to suppress leaked electromagnetic waves possibly needs to be provided around the power feeder and the power receiver, in order to comply with the aforementioned radio wave protection guidelines. In other words, there is such a technical problem that degree of design freedom is possibly reduced.

In view of the aforementioned problem, it is therefore an object of the present invention to provide a power transmitting apparatus that can improve the degree of design freedom.

Solution to Problem

The above object of the present invention can be achieved by A power transmitting apparatus is provided with: a power feeder; a power receiver disposed with a space from said power feeder; a power storing device electrically connected to said power feeder and configured to supply power to a load; a distance changing device configured to change a distance between said power feeder and said power receiver; a detecting device configured to detect a power storage state associated with said power storing device; and a controlling device configured to control said power feeder to change output power according to the detected power storage state, and configured to control said distance changing device to change the distance.

The operation and other advantages of the present invention will become more apparent from an embodiment and examples explained below.

DESCRIPTION OF EMBODIMENTS

Figure 1:
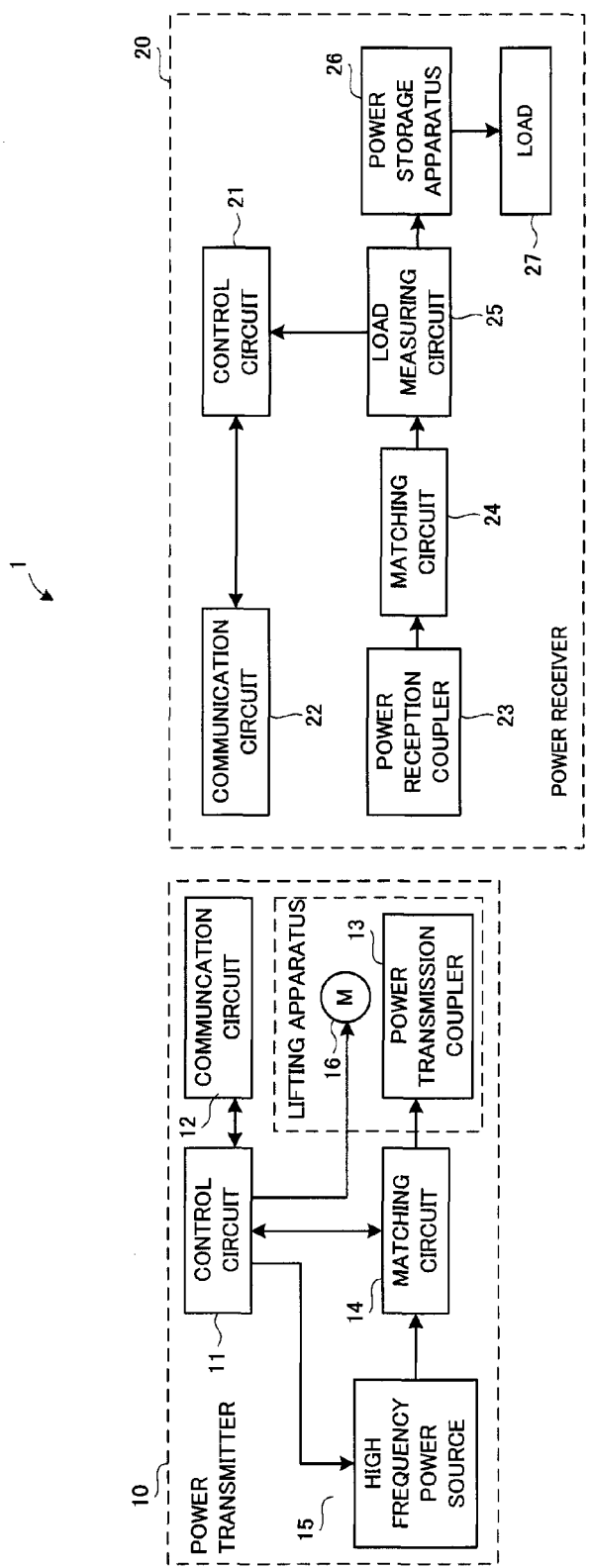
FIG. 1 is a block diagram illustrating a configuration of a power transmitting apparatus according to a first example.

An embodiment according to the power transmitting apparatus of the present invention will be explained.

The power transmitting apparatus according to the embodiment is provided with the power feeder, the power receiver, the power storing device, the distance changing device, the detecting device, and the controlling device.

In operation of the power transmitting apparatus, power transmission is performed from the power feeder to the power receiver in a wireless manner, for example, by magnetic resonance or the like. At this time, the power feeder and the power receiver are disposed opposite to each other via a space. When the power transmission is not performed, the power feeder and the power receiver may not be disposed opposite to each other.

The power storing device such as, for example, a battery is electrically connected to the power feeder, and stores power charged by the power receiver. The power storing device is also electrically connected to the load such as, for example, a lighting apparatus and a speaker, and supplies power to the load.

The distance changing device is configured to change the distance between the power feeder and the power receiver. When the distance is changed, one of the power feeder and the power receiver may be moved, or both of the power feeder and the power receiver may be moved The detecting device detects the power storage state associated with the power storing device. To a value used as a physical quantity or a parameter indicating the power storage state, various known aspects such as, for example, a ratio of a present capacitance to a fully charged capacitance can be applied.

The controlling device, which is provided with, for example, a memory, a processor, and the like, controls the power feeder to change the output power according to the detected power storage state, and controls the distance changing device to change the distance between the power feeder and the power receiver. Specifically, for example, the controlling device controls the distance changing device to reduce the distance between the power feeder and the power receiver if the controlling device controls the power feeder to increase the output power according to the detected power storage state.

By virtue of such a configuration, for example, the controlling device allows the power feeder to output relatively low power if the power storage state is close to full charge, and allows the power feeder to output relatively high power if the power storage state is close to empty. Here, in particular, the distance between the power feeder and the power receiver can be changed by the distance changing device. Thus, if the distance between the power feeder and the power receiver is reduced if the relatively high power is outputted from the power feeder, it is possible to relatively easily suppress leaked electromagnetic waves without providing, for example, a shield case or the like.

As a result, according to the power transmitting apparatus in the embodiment, it is possible to improve the degree of design freedom while complying with the radio wave protection guidelines or the like. If the power transmitting apparatus according to the embodiment is applied, for example, to a power supplier of a lighting apparatus, then, it is possible to make a power feed cable inconspicuous and to improve a stage effect using the lighting apparatus.

EXAMPLES

Examples according to the power transmitting apparatus of the present invention will be explained with reference to the drawings.

First Example

A first example of the power transmitting apparatus of the present invention will be explained with reference to FIG. 1 and FIGS. 2. FIG. 1 is a block diagram illustrating a configuration of the power transmitting apparatus according to the first example. FIGS. 2 are conceptual diagrams illustrating operation of the power transmitting apparatus according to the first example.

In FIG. 1, a power transmitting apparatus is provided with a power transmitter 10 and a power receiver 20. In the example, between the power transmitter 10 and the power receiver 20, power transmission is performed in a wireless manner by magnetic resonance.

The power transmitter 10 is provided with a control circuit 11, a communication circuit 12, a power transmission coupler 13, a matching circuit 14, a high-frequency power supply 15, and a motor 16. The power transmission coupler 13 is mounted on a lifting apparatus having the motor 16.

The power receiver 20 is provided with a control circuit 21, a communication circuit 22, a power reception coupler 23, a matching circuit 24, a load measuring circuit 25, a power storing apparatus 26, and a load 27. The power storing apparatus 26 is specifically, for example, a battery charger, a large capacitor, or the like. The load is, in the example, a light emitting apparatus such as LED, organic EL, a fluorescent tube, and a light bulb.

The load measuring circuit 25 measures, for example, load impedance or the like, and transmits a signal indicating a measurement result to the control circuit 21. Here, for example, the load impedance is reflected in a power storage state of the power storing apparatus 26. It is thus possible to detect or estimate the power storage state from the measurement result by the load measuring circuit 25.

The control circuit 21 of the power receiver transmits the signal indicating the measurement result by the load measuring circuit 25, to the power transmitter 10 via the communication circuit 22. The control circuit 11 of the power transmitter 10 controls the high-frequency power supply 15 to change output power on the basis of the signal indicating the measurement result received via the communication circuit 12, and controls the motor 16 to change a distance between the power transmission coupler 13 and the power reception coupler 23.

Now, the power transmitting apparatus 1 according to the embodiment will be explained with reference to FIGS. 2.

In FIGS. 2, the power transmitter 10 is disposed near a ceiling. Here, out of the members that constitute the power transmitter 10, the members other than the power transmission coupler 13 are disposed behind the ceiling. The power receiver 20 is hung from the ceiling by a support member, which is made of an insulator such as, for example, nylon, and which is one example of the "supporting device" according to the present invention. In FIGS. 2, in order to avoid a complicated drawing, only the main members out of the members illustrated in FIG. 1 are illustrated.

Figure 2A:
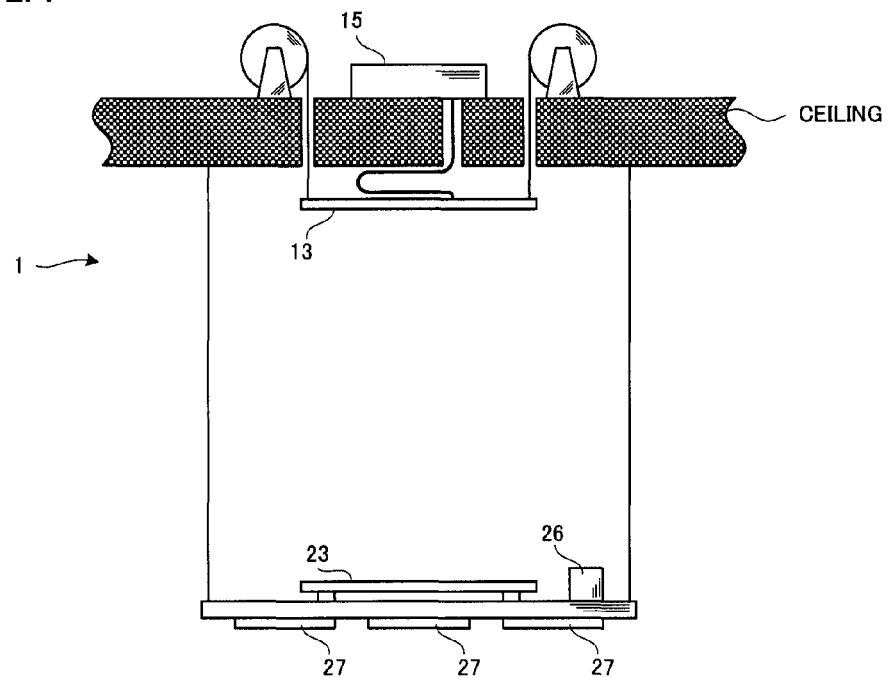
FIG. 2 are conceptual diagrams illustrating operation of a power transmitting apparatus according to the first example.

If the power storage state of the power storing apparatus 26 is close to full charge, the control circuit 11 of the power transmitter 10 controls the high-frequency power supply 15 to output relatively low power, and controls the motor 16 to make a relatively long distance between the power transmission coupler 13 and the power reception coupler 23 (refer to FIG. 2A). This is because if the output power is relatively low, there are relatively less leaked electromagnetic waves, and even if the distance between the power transmission coupler 13 and the power reception coupler 23 is relatively long, for example, the radio wave protection guidelines or the like can be complied with.

As a result, it is possible to realize a stage effect as if a light emitting apparatus (i.e. the load 27) were floating in the air.

Figure 2B:
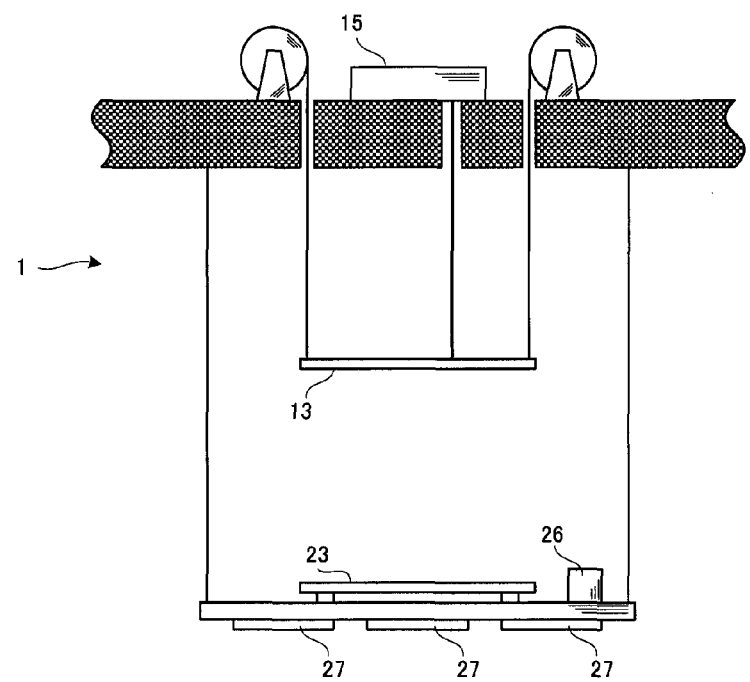

On the other hand, if the power storage state of the power storing apparatus 26 is close to empty, the control circuit 11 of the power transmitter 10 controls the high-frequency power supply 15 to output relatively high power, and controls the motor 16 to make a relatively short distance between the power transmission coupler 13 and the power reception coupler 23 (refer to FIG. 2B). By virtue of such a configuration, it is possible to supply relatively high power to the power receiver 20 while suppressing the leaked electromagnetic waves.

The "power transmission coupler 13", the "matching circuit 14", and the "high-frequency power supply 15" according to the example are one example of the "power feeder" according to the present invention. The "power reception coupler 23", the "power storing apparatus 26", the "motor 16", the load measuring circuit 25", and the "control circuit 11" according to the example are respectively one example of the "power receiver", the "power storing device", the "distance changing device", the "detecting device", and the "controlling device" according to the present invention.

Second Example

Figure 3:
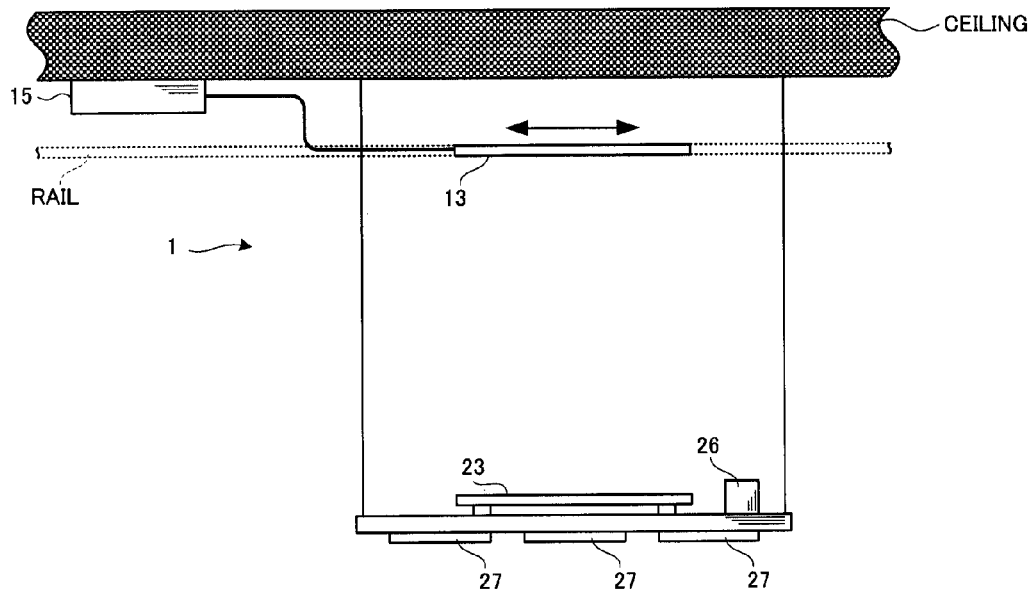
FIG. 3 is a conceptual diagram illustrating a configuration of a power transmitting apparatus according to a second example.

A second example of the power transmitting apparatus of the present invention will be explained with reference to FIG. 3. FIG. 3 is a conceptual diagram illustrating a configuration of the power transmitting apparatus according to the second example.

In the example, as illustrated in FIG. 3, the power transmission coupler 13 is configured to move along a rail in a horizontal direction of the paper.

In this case, the control circuit 11 of the power transmitter 10 controls a driving apparatus (not illustrated) configured to move the power transmission coupler 13 in such a manner that the power transmission coupler 13 and the power reception coupler 23 are disposed opposite to each other if the power storing apparatus 26 is in a power storage state that requires charging. The control circuit 11 further controls the high-frequency power supply 15 to output power.

On the other hand, if the power storing apparatus 26 is not charged, the control circuit 11 controls the driving apparatus in such a manner that the power transmission coupler 13 moves, for example, to the left on the paper, and controls the high-frequency power supply 15 not to output power.

Third Example

Figure 4:
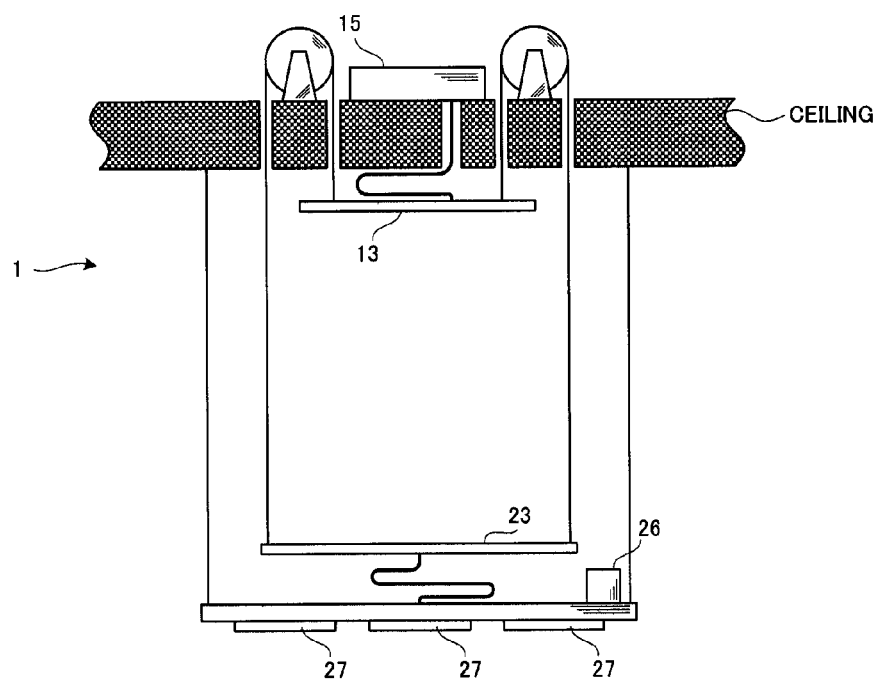
FIG. 4 is a conceptual diagram illustrating a configuration of a power transmitting apparatus according to a third example.

A third example of the power transmitting apparatus of the present invention will be explained with reference to FIG. 4. FIG. 4 is a conceptual diagram illustrating a configuration of the power transmitting apparatus according to the third example.

In the example, as illustrated in FIG. 4, the power transmission coupler 13 and the power reception coupler 23 are coupled with each other by a support member, which is made of an insulator such as, for example, nylon. Then, if the power transmission coupler 13 is lowered, the power reception coupler 23 is lifted with the lowering of the power transmission coupler 13. If the power transmission coupler 13 is lifted, the power reception coupler 23 is lowered with the lifting of the power transmission coupler 13.

Fourth Example

Figure 5:
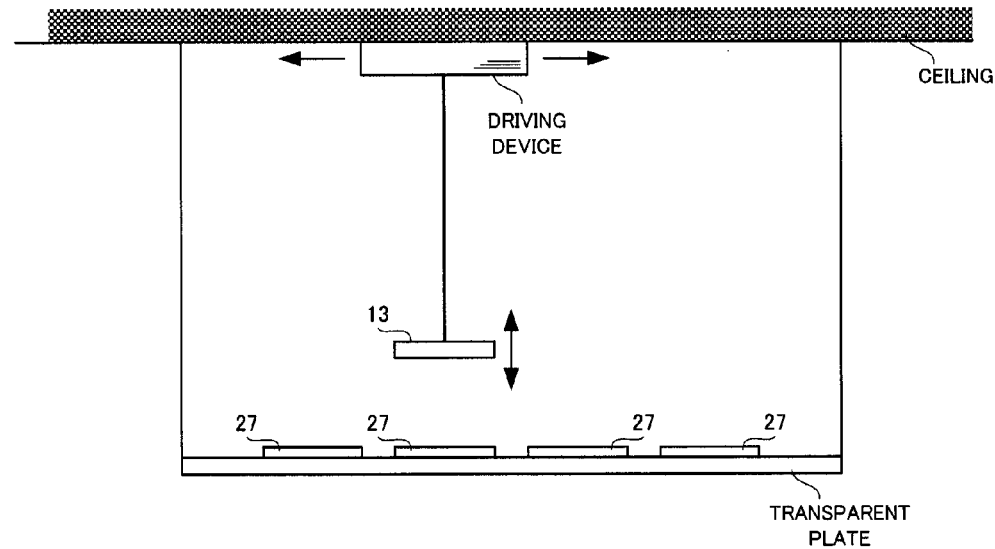
FIG. 5 is a conceptual diagram illustrating a configuration of a power transmitting apparatus according to a fourth example.

A fourth example of the power transmitting apparatus of the present invention will be explained with reference to FIG. 5. FIG. 5 is a conceptual diagram illustrating a configuration of the power transmitting apparatus according to the fourth example.

In the example, as illustrated in FIG. 5, a plurality of power receivers 20 each of which is provided with a light emitting apparatus (i.e. the load 27) are planarly arranged on a transparent plate. On the other hand, the power transmitter 10 is provided with a driving device configured to move in a two dimensional direction along the ceiling. The control circuit 11 of the power transmitter 10 controls the driving device in such a manner that the power transmission coupler 13 is disposed opposite to the power reception coupler 23 of the power receiver 20 provided with the power storing apparatus 26 to be charged. The control circuit 11 further controls the motor to lower the power transmission coupler 13 toward the opposite power reception coupler 23, and controls the high-frequency power supply 15 to output power.

By virtue of such a configuration, one power transmitter 10 can charge the power storing apparatuses 26 provided for the plurality of power receivers 20, which is extremely useful in practice.

Fifth Example

A fifth example of the power transmitting apparatus of the present invention will be explained with reference to FIG. 6.

Figure 6:
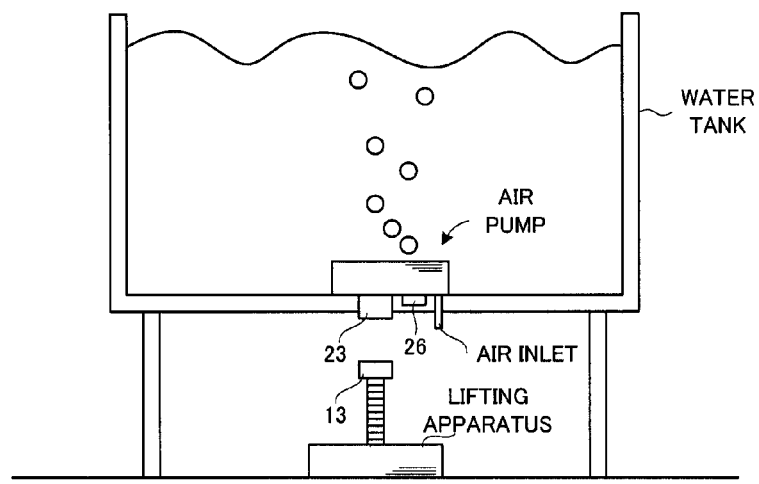
FIG. 6 is a conceptual diagram illustrating a configuration of a power transmitting apparatus according to a fifth example.

FIG. 6 is a conceptual diagram illustrating a configuration of the power transmitting apparatus according to the fifth example.

In the example, as illustrated in FIG. 6, the power receiver 20 is provided with an air pump as the load 27. As illustrated in FIG. 6, the power transmitter 10 is disposed on a floor. Then, the controlling device 11 controls the motor 16 to lift the power transmission coupler 13 according to the power storage state of the power storing apparatus 26 of the power receiver 20, and controls the high-frequency power supply 15 to output power.

The present invention is not limited to the aforementioned embodiment and examples, but various changes may be made, if desired, without departing from the essence or spirit of the invention which can be read from the claims and the entire specification. A power transmitting apparatus which involves such changes is also intended to be within the technical scope of the present invention.

DESCRIPTION OF REFERENCE NUMERALS 1 power transmitting apparatus
10 power transmitter
11, 21 control circuit
12, 22 communication circuit
13 power transmission coupler
14, 24 matching circuit
15 high-frequency power supply
16 motor
20 power receiver
23 power reception coupler
25 load measuring circuit
26 power storing apparatus
27 load

The invention claimed is:

1. A power transmitting apparatus comprising:
a power feeder;
a power receiver disposed with a space from said power feeder;
a power storing device electrically connected to said power feeder and configured to supply power to a load;
a detecting device configured to detect a power storage state associated with said power storing device;
a distance changing device configured to change a distance between said power feeder and said power receiver; and
a controlling device configured to control said power feeder to change output power outputted from said power feeder according to the detected power storage state, and to control said distance changing device to change the distance according to the output power.

2. The power transmitting apparatus according to claim 1, wherein said controlling device controls said distance changing device to reduce the distance if said controlling device controls said power feeder to increase the output power, and controls said distance changing device to extend the distance if said controlling device controls said power feeder to decrease the output power.

3. The power transmitting apparatus according to claim 2, wherein
the load is a lighting apparatus, and
said power transmitting apparatus further comprises a supporting device configured to hang and support the load, said power receiver, and said power storing device as a whole.

4. The power transmitting apparatus according to claim 3, wherein said power transmitting apparatus further comprises a driving device configured to change a position of said power feeder, said controlling device controls said driving device to move said power feeder to a position where said power feeder is opposite to said power receiver if charging said power storing device is required on the basis of the detected power storage state, and controls said driving device to move said power feeder to a position where said power feeder is not opposite to said power receiver if charging said power storing device is not required on the basis of the detected power storage state.

5. The power transmitting apparatus according to claim 2, wherein said power transmitting apparatus further comprises a driving device configured to change a position of said power feeder, said controlling device controls said driving device to move said power feeder to a position where said power feeder is opposite to said power receiver if charging said power storing device is required on the basis of the detected power storage state, and controls said driving device to move said power feeder to a position where said power feeder is not opposite to said power receiver if charging said power storing device is not required on the basis of the detected power storage state.

6. The power transmitting apparatus according to claim 1, wherein the load is a lighting apparatus, and said power transmitting apparatus further comprises a supporting device configured to hang and support the load, said power receiver, and said power storing device as a whole.

7. The power transmitting apparatus according to claim 6, wherein said power transmitting apparatus further comprises a driving device configured to change a position of said power feeder, said controlling device controls said driving device to move said power feeder to a position where said power feeder is opposite to said power receiver if charging said power storing device is required on the basis of the detected power storage state, and controls said driving device to move said power feeder to a position where said power feeder is not opposite to said power receiver if charging said power storing device is not required on the basis of the detected power storage state.

8. The power transmitting apparatus according to claim 1, wherein said power transmitting apparatus further comprises a driving device configured to change a position of said power feeder, said controlling device controls said driving device to move said power feeder to a position where said power feeder is opposite to said power receiver if charging said power storing device is required on the basis of the detected power storage state, and controls said driving device to move said power feeder to a position where said power feeder is not opposite to said power receiver if charging said power storing device is not required on the basis of the detected power storage state.

* * * * *